(12) United States Patent
Jovanovic et al.

(10) Patent No.: US 11,295,075 B2
(45) Date of Patent: Apr. 5, 2022

(54) AUTOMATIC GENERATION OF ALTERNATIVE CONTENT LAYOUTS

(71) Applicant: MICROSOFT TECHNOLOGY LICENSING, LLC, Redmond, WA (US)

(72) Inventors: Katarina Jovanovic, Belgrade (RS); Andreja Ilic, Belgrade (RS); Umachandra Chikkareddy, San Jose, CA (US); Dragan Slaveski, Belgrade (RS); Igor Ilic, Belgrade (RS); Marko Zoran Djokic, Belgrade (RS); Sladjan Kantar, Arandelovac (RS); Vladimir Ilic, Belgrade (RS); Damjan Dakic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/732,145

(22) Filed: Dec. 31, 2019

(65) Prior Publication Data
US 2021/0200942 A1 Jul. 1, 2021

(51) Int. Cl.
*G06F 40/186* (2020.01)
*G06N 20/00* (2019.01)
(Continued)

(52) U.S. Cl.
CPC .......... *G06F 40/186* (2020.01); *G06F 40/106* (2020.01); *G06F 40/197* (2020.01);
(Continued)

(58) Field of Classification Search
CPC .... G06F 40/103; G06F 40/106; G06F 40/186; G06F 40/137; G06F 40/151;
(Continued)

(56) References Cited

U.S. PATENT DOCUMENTS 5,517,621 A * 5/1996 Fukui ...................... G06T 11/60
715/210
7,468,805 B2 * 12/2008 Lo .......................... G06F 40/174
358/1.18
(Continued)

OTHER PUBLICATIONS

"International Search Report and Written Opinion Issued in PCT Application No. PCT/US2020/059257", dated Feb. 16, 2021, 10 Pages.

*Primary Examiner* — Wilson W Tsui
(74) *Attorney, Agent, or Firm* — Jacob P. Rohwer; Newport IP, LLC

(57) ABSTRACT

A system is configured to automatically enhance user content by dynamically generating alternative layouts given an original layout of the user content. The alternative layouts are generated based on determined roles for a number of different content elements on a canvas and/or detected semantic relationships between content elements. Once the alternative layouts are generated, the system can evaluate the alternative layouts and assign a score to each of the alternative layouts. The system can then identify recommended alternative layouts that are suitable for a particular purpose (e.g., a professional presentation, a teaching lesson, etc.), and provide the recommended alternative layouts for display on a device of a user.

17 Claims, 9 Drawing Sheets

(51) Int. Cl.
*G06F 40/197* (2020.01)
*G06F 40/106* (2020.01)
*G06F 40/30* (2020.01)
*G06N 5/04* (2006.01)

(52) U.S. Cl.
CPC ............... *G06F 40/30* (2020.01); *G06N 5/04* (2013.01); *G06N 20/00* (2019.01)

(58) Field of Classification Search
CPC ...... G06F 40/166; G06F 40/197; G06F 40/30; G06N 20/00; G06N 5/04
See application file for complete search history.

(56) References Cited

U.S. PATENT DOCUMENTS

| | | | | |
|---|---|---|---|---|
| 9,875,229 B2* | 1/2018 | Ying | ............... | G06F 40/166 |
| 10,606,925 B2* | 3/2020 | O'Donovan | ............ | G06F 40/103 |
| 2004/0194028 A1* | 9/2004 | O'Brien | ............ | G06F 40/103 |
| | | | | 715/247 |
| 2006/0082594 A1* | 4/2006 | Vafiadis | ............... | G06F 40/166 |
| | | | | 345/629 |
| 2006/0150092 A1* | 7/2006 | Atkins | ............... | G06T 11/60 |
| | | | | 715/251 |
| 2006/0179405 A1* | 8/2006 | Chao | ............... | G06F 40/186 |
| | | | | 715/209 |
| 2006/0203294 A1* | 9/2006 | Makino | ............... | G06T 11/60 |
| | | | | 358/400 |
| 2006/0259858 A1* | 11/2006 | Collins | ............... | G06F 40/103 |
| | | | | 715/243 |
| 2010/0088605 A1* | 4/2010 | Livshin | ............... | G06T 11/60 |
| | | | | 715/731 |
| 2010/0095204 A1* | 4/2010 | Kobayashi | ............ | G06F 40/103 |
| | | | | 715/700 |
| 2011/0016385 A1* | 1/2011 | Kasuga | ............... | G06T 11/60 |
| | | | | 715/243 |
| 2015/0310124 A1 | 10/2015 | Ben-aharon et al. | | |
| 2016/0092428 A1 | 3/2016 | Llic et al. | | |
| 2016/0292132 A1* | 10/2016 | Briggs | ............... | G06F 40/103 |
| 2016/0292134 A1* | 10/2016 | Elings | ............... | G06F 40/131 |
| 2018/0150446 A1 | 5/2018 | Sivaji et al. | | |
| 2020/0257898 A1* | 8/2020 | Cirimele | ............ | G06K 9/00402 |

* cited by examiner

AUTOMATIC GENERATION OF ALTERNATIVE CONTENT LAYOUTS

BACKGROUND

Users of content editing applications often struggle to create documents that look nice due to a lack of knowledge of the content editing applications being used and/or a lack of time. Example content editing applications include GOOGLE SLIDES, PREZI PRESENTATIONS, CANVA, HAIKU DECK ZURU, SLIDEBEAN, MICROSOFT POWERPOINT, and so forth. Using various ones of the example content editing applications mentioned above, the user may arrange the content on "slides" of a presentation deck.

Generally, content editing applications provide functionality, to a user, that is aimed at content enhancement. One conventional approach provides a user with different fixed layout templates so a user selection of a specific fixed layout template can be made for the content being edited by the user. Content being edited (e.g., created) by a user may be referred to herein as user content. A fixed layout template is typically generated by a professional designer in advance and made available to users of a content editing application. However, a user often spends a considerable amount of time searching for an ideal fixed layout template. Moreover, due to the fixed nature, the user typically has limited flexibility with regard to changing a fixed layout template. Consequently, a user may be unable to add a new type of content or move the content to optimize the presentation. Or, the user may be unaware of mechanisms provided to alter the way in which a fixed layout template arranges the content.

To illustrate, a set of fixed layout templates for a content editing application may only accommodate up to four images on a slide using various placeholders. Accordingly, the content editing application is not in a position to offer an appropriate fixed layout template for a slide in which the user wants to insert five or more images. This illustration is but one that shows how fixed layout templates may be ineffective with respect to accommodating more complex arrangements of user content.

As a result of the deficiencies described above with respect to the use of fixed layout templates, the user often needs to create her or his own layout of content. However, due to lack of time and/or a lack of experience using a content editing application, a generated slide often contains a large amount of blank space and/or disjointed content. Accordingly, the presentation of the content may be unsuitable for certain environments (e.g., a formal professional presentation, a formal academic presentation, etc.).

It is with respect to these considerations and others that the disclosure made herein is presented.

SUMMARY

The techniques disclosed herein describe a system configured to automatically enhance user content by dynamically generating alternative layouts given an original layout of the user content. In various examples described herein, the user content is arranged in an original layout on a presentation slide. However, the techniques described herein may be applied to other types of canvases in which content can be edited as well (e.g., a page, a spread sheet, a digital whiteboard, or any other portion or division of a document).

Once the alternative layouts are generated, the system can evaluate the alternative layouts and assign a score to each of the alternative layouts. The system can determine the score based on an amount of blank space (e.g., white space, empty space, etc.) on the slide. This factor may be used to determine a score of the alternative layout because an alternative layout with less blank space typically looks nicer to a consumer of the content compared to an alternative layout with more blank space. Thus, the alternative layout with less blank space may be scored higher. Additionally or alternatively, the system can determine the score based on a degree to which the content changes positions and/or sizes when comparing the original layout of the content to an alternative layout of the content. This factor may be used to determine a score of the alternative layout because one of the goals in creating the alternative layouts may be to honor, or maintain, the user intent in creating the original layout.

As described herein, the user content includes different content elements that are initially arranged in different positions on the original layout. Each of the content elements covers an area on the canvas such as a slide. A content element has an associated type. For instance, a content element can be a title element, a sub-title element, a body text element, a header or a footer element, a numbering element, an image element, a caption element, or so forth. The techniques described herein can accommodate other types of content elements as well. The system is configured to use a machine learning classifier to analyze an original layout of a slide to determine a role for each of the content elements arranged on the slide. The role of the content element corresponds to the type of content element. The system determines the roles of the content elements because different alternative layout behavior may be preferred to optimize the presentation of the content. For example, a preference may indicate that a title of the slide remain a dominant element compared to other types of content elements. In another example, a preference may indicate that a header or a footer should not be presented in the middle of the slide, but rather, should be a subtle content element positioned in an outlying region of the slide (e.g., at the top or the bottom of the slide).

The machine learning classifier can consider different parameters when determining the role of a particular content element. For example, to distinguish between content elements that typically include text (e.g., titles, sub-titles, bodies, captions, headers or footers, etc.), the machine learning classifier can consider a number of words used in a content element, a position of a content element, a size of the text used in the content element. Further, the machine learning classifier can perform natural language processing to understand relationships between the words used in the different content elements, so that the roles can be identified. In another example, when identifying an image content element, the machine learning classifier can analyze the content element to determine if the content element includes graphical content (e.g., a photograph, a drawing, a video, etc.). The determination of roles may be useful because, in some instances, a user editing the content may inadvertently place body text in a reserved placeholder that is intended for sub-title text.

The system is also configured to detect semantic relationships between content elements so that the detected semantic relationships can be preserved in the alternative layouts. This is important because if semantically related content elements are separated, the content of the slide may be incomprehensible to a consumer of the content. While most if not all of the content elements on a slide have some sort of relationship, the system is trained to use the roles of the content elements to identify relationships that satisfy a level of meaning such that the relationships need to be maintained or the presentation of the content may become confusing or incomprehensible.

One example of a semantic relationship that satisfies the level of meaning involves an image and text that describes the image (e.g., a caption). These two content elements should remain close to one another in the alternative layouts to preserve the semantic relationship—or to ensure that a consumer can easily locate and read the text that explains the image (e.g., a graph, a photograph, a dataset, etc.). Another example of a semantic relationship that satisfies the level of meaning involves a title and a sub-title. To preserve this semantic relationship, these two content elements should graphically be presented so that the hierarchy, where the title is in a dominant position compared to subordinate positions of the sub-titles, can be noticed by a consumer. In yet another example of a semantic relationship that satisfies the level of meaning, a diagram composed of different image content elements that contain various shapes may need to be presented in the same or similar positions, or the diagram will be broken and incomprehensible. A further example of a semantic relationship that satisfies the level of meaning involves a sub-title and a body of text associated with that specific sub-title. These two content elements should remain close to one another in the alternative layouts to preserve the semantic relationship—or to ensure that the body of text is not mistakenly rearranged to be visually associated with another sub-title on the slide.

The system is configured to consider the roles of the content elements and the detected semantic relationships when generating the alternative layouts. More specifically, in an individual alternative layout, the system rearranges the original user content by changing a position of at least one content element and/or increasing a size of at least one content element to remove blank space. Moreover, the system ensures that each of the alternative layouts preserves the detected semantic relationships between content elements.

When generating the alternative layouts, the system may determine limitations associated with different roles. For example, a limitation may indicate that titles and sub-titles must be presented in a dominant nature compared to other types of content elements. Accordingly, the text size of titles and sub-titles most likely will be larger than the text size used in bodies, captions, and headers/footers, etc. In another example, a limitation may indicate that images must maintain the original aspect ratio and/or not be cropped. In yet another example, a limitation may indicate that text must be a minimum size so that the text is readable.

The system may further be configured to honor the original intent of the user while also providing value in generating the alternative layouts. To do this, the system can classify a content element as a moveable element or a non-moveable element. A moveable content element is one that can change positions relative to other content elements on the slide. A non-moveable content element is one that cannot change positions relative to other content elements on the slide. By considering only a subset of the original content elements to change positions in the alternative layouts, the system can implement a partial rearrangement.

In one example, the classification of a content element as a moveable element or a non-moveable element can be determined based on whether a role of the content element indicates a position change capability or a position change incapability. In another example, the classification of a content element as a moveable element or a non-moveable element can be determined based on whether the content element is part of a semantic relationship (e.g., content elements that are not involved in a semantic relationship may be more likely to change positions). In yet another example, the classification of a content element as a moveable element or a non-moveable element can be determined based on an importance factor associated with the content element. The importance factor can be determined from an order of entry of the original content. That is, a user typically may be more likely to enter more important content (e.g., title, sub-titles, images) earlier and less important content later (e.g., header or footer, body, etc.). Thus, the importance factor can be used to ensure that the user's original structure of more important content elements on the slide is maintained, while less important content elements provide the flexibility for rearrangement in the alternative layouts. Therefore, a content element on an original slide that is associated with a capability of changing positions, that is not semantically related to another content element, and/or that is determined to be less important based on an order of entry, may be identified as one that has the flexibility to change positions in the alternative layouts.

Consequently, the system implements dynamic alternative layout generation that can be applied to any original configuration of content, whether the configuration is user defined or a fixed layout configuration. This enables a user to focus more time on the actual content rather than the way in which the content is structured and presented on a slide. Via the approached described herein, any number of content elements and/or different types of content elements can be accommodated when generating the alternative layouts. Moreover, user intent associated with the editing of the original slide can be preserved as the alternative layouts can be configured to maintain the original structure of non-moveable content elements and/or the semantic relationships between content elements. The disclosed techniques provide a clear advantage over the conventional solutions in that there is no further need for professional designers to spend time and computing resources creating a large number of new fixed layout templates.

In various embodiments, the system is configured to assign a score to each of the alternative layouts generated and produce a ranking based on the score. The system can then select the best, or recommended, alternative layouts using the ranking. In some instances, the system can provide all the generated alternative layouts to the user so the user can select one to use. In this case, a display may distinguish between the top-ranked alternative layouts and other alternative layouts that are ranked lower. In other instances, the system may only provide one or more recommended alternative layouts for the user to consider. Accordingly, the techniques described herein offer a user a variety of quality layout choices that are visually appealing (e.g., look nice for a professional or academic environment) and/or that are aligned with the user intent in the originally created slide.

The score can be determined based on one or more factors. For example, a score for an alternative layout can be determined based on an amount of blank space. That is, more blank space on a slide may contribute to a lower score and less blank space on a slide may contribute to a higher score. In another example, a score for an alternative layout can be determined based on a number of important content elements that change positions. As described above, the importance of a content element can be determined based on one or more of: a role, a semantic relationship, or a user entry order. A higher number of important content elements that change positions may contribute to a lower score and a lower number of important content elements that change positions contribute to a higher score. In yet another example, a score for an alternative layout can be determined based on element size differences between content elements deemed important and other non-important content elements. That is, the scoring can provide value to having certain content elements (e.g., titles, sub-titles, and/or images) be more dominant content elements in the alternative layouts.

In further examples, a score for an alternative layout can be determined based on one or more of: a degree to which the content elements are aligned (e.g., top alignment, bottom alignment, left side alignment, right side alignment, etc.), a degree to which the content elements are symmetrical (e.g., left and right side symmetry, top and bottom symmetry, etc.), an amount of spacing between individual ones of the content elements (e.g., alternative layouts with even spacing that allows a viewer to distinguish between content elements may be scored higher than alternative layouts that have content elements packed closely together), an amount of spacing between individual ones of the content elements and an edge of the slide (e.g., a slide has properly sized margins), or a degree to which emphasis levels between individual ones of the content elements are maintained provided the original emphasis levels of the original slide. Moreover, the system can configure different weights for the different factors when determining scores.

In various embodiments, the system can apply different styles in association with a purpose of the document (e.g., a business presentation, a teaching lesson, etc.). A style can include a specific font and/or background colors and images. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The Detailed Description discloses aspects of a system configured to automatically enhance user content by dynamically generating alternative layouts given an original layout of the user content. The alternative layouts are generated based on determined roles for a number of different content elements on a canvas and/or detected semantic relationships between content elements. Once the alternative layouts are generated, the system can evaluate the alternative layouts and assign a score to each of the alternative layouts. For example, the system can determine the score based on an amount of blank space (e.g., white space, empty space, etc.) on a canvas, a degree to which the content elements are aligned, a degree to which the content elements are symmetrical, an amount of spacing between individual ones of the content elements, an amount of spacing between individual ones of the content elements and an edge of the slide, and/or a degree to which emphasis levels between individual ones of the content elements are maintained provided the original emphasis levels of the original slide.

The system can then identify recommended alternative layouts that are suitable for a particular purpose (e.g., a professional presentation, a teaching lesson, etc.), and provide the recommended alternative layouts for display on a device of a user. In various embodiments, the system can apply different styles in association with a purpose of the document (e.g., a business presentation, a teaching lesson, etc.). A style can include a specific font and/or background colors and images.

In various examples described herein, the user content is arranged in an original layout on a presentation slide. However, the techniques described herein may be applied to other types of canvases in which content can be edited as well (e.g., a page, a spread sheet, a digital whiteboard, or any other portion or division of a document).

Figure 1:
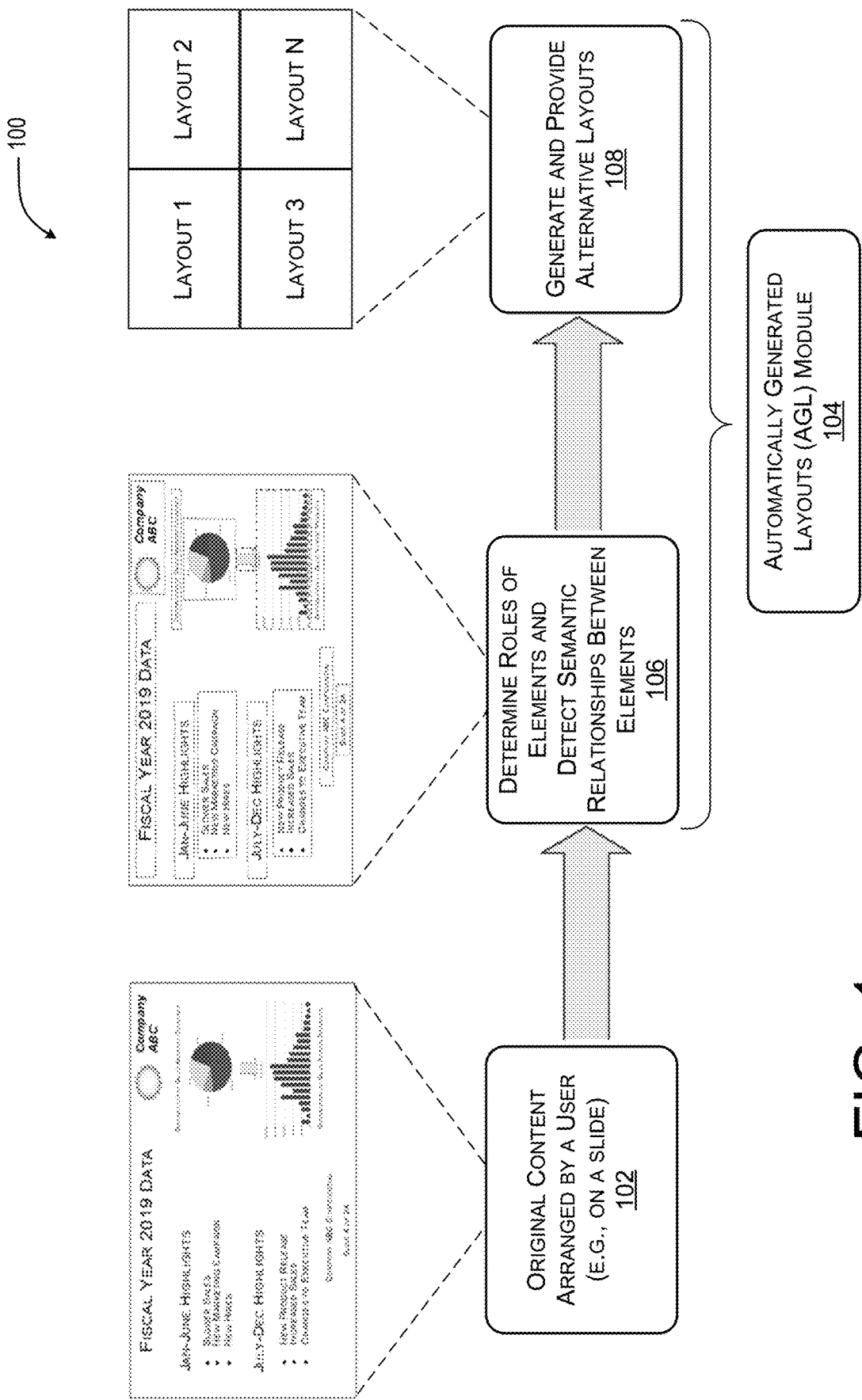
FIG. 1 illustrates an example diagram that generates alternative layouts given original content arranged by a user on a canvas such as a slide.

FIG. 1 illustrates an example diagram 100 that generates alternative layouts given original content arranged by a user on a canvas such as a slide. As shown, a user creates the original content 102 and arranges the content on a canvas such as a slide. An example slide used throughout this disclosure relates to "Fiscal Year 2019 Data" for "Company ABC". The original content 102 includes different content elements that are initially arranged in different positions. Each of the content elements covers an area on the slide. The areas may be separated, or in some instances, the areas may overlap (e.g., one content element may be fully or partially overlaid on another content element). As described above, a content element has an associated type. For instance, a content element can be a title element, a sub-title element, a body text element, a header or a footer element, a numbering element, an image element, a caption element, or so forth.

The original content 102 is provided to an automatically generated layouts (AGL) module 104. The AGL module 104 is configured to determine a role for each of the content elements arranged on the slide and to detect semantic relationships between content elements 106. The AGL module 104 is then configured to use the roles of the content elements and the semantic relationships to generate and provide alternative layouts 108 in which the original content is arranged in different combinations (e.g., layouts 1-N). In an individual alternative layout, the AGL module 104 rearranges the original content by changing a position of at least one content element. Moreover, the AGL module 104 ensures that each of the alternative layouts preserves the semantic relationships between content elements.

The determination of roles may be useful because, in some instances, a user editing the content may inadvertently place body text in a reserved placeholder that is intended for sub-title text. The role of the content element corresponds to the type of content element. The AGL module 104 determines the roles of the content elements because different alternative layout behavior may be preferred to optimize the presentation of the content. For example, a preference may indicate that a title of the slide remain a dominant element compared to other types of content elements. In another example, a preference may indicate that a header or a footer should not be presented in the middle of the slide, but rather, should be a subtle content element positioned in an outlying region of the slide (e.g., at the top or the bottom of the slide).

The AGL module 104 can use a machine learning classifier that considers different parameters when determining the role of a particular content element. The machine learning classifier may be trained using human classification of content elements in a corpus of training data (e.g., a large number of training slides with labeled content elements). One example parameter that may be used by the machine learning classifier to distinguish between content elements that typically include text (e.g., titles, sub-titles, bodies, captions, headers or footers, etc.) may be a number of words used in a content element. Other example parameters that may be used by the machine learning classifier to distinguish between content elements that typically include text may be a position of a content element on a canvas or a size of the text used in the content element.

The machine learning classifier can additionally or alternatively perform natural language processing to understand relationships between the words used in the different content elements, so that the roles can be identified. Further, when identifying an image content element, the machine learning classifier can analyze the content element to determine if the content element includes graphical content (e.g., a photograph, a drawing, a video, etc.).

A semantic relationship is an association between content elements that is meaningful, or that is needed to ensure the content can be efficiently and effectively comprehended by a consumer. One example of a semantic relationship involves an image and text that describes the image (e.g., a caption). These two content elements should remain close to one another in the alternative layouts 108 to preserve the semantic relationship—or to ensure that a consumer can easily locate and read the text that explains the image (e.g., a graph, a photograph, a dataset, etc.). Another example of a semantic relationship involves a title and a sub-title. To preserve this semantic relationship, these two content elements should graphically be presented so that the hierarchy, where the title is in a dominant position compared to subordinate positions of the sub-titles, can be noticed by a consumer. In yet another example of a semantic relationship, a diagram composed of different image content elements that contain various shapes or objects may need to be presented in the same or similar positions, or the diagram will be broken and incomprehensible. A further example of a semantic relationship involves a sub-title and a body of text associated with that specific sub-title. These two content elements should remain close to one another in the alternative layouts 108 to preserve the semantic relationship—or to ensure that the body of text is not mistakenly rearranged to be visually associated with another sub-title on the slide.

Figure 2:
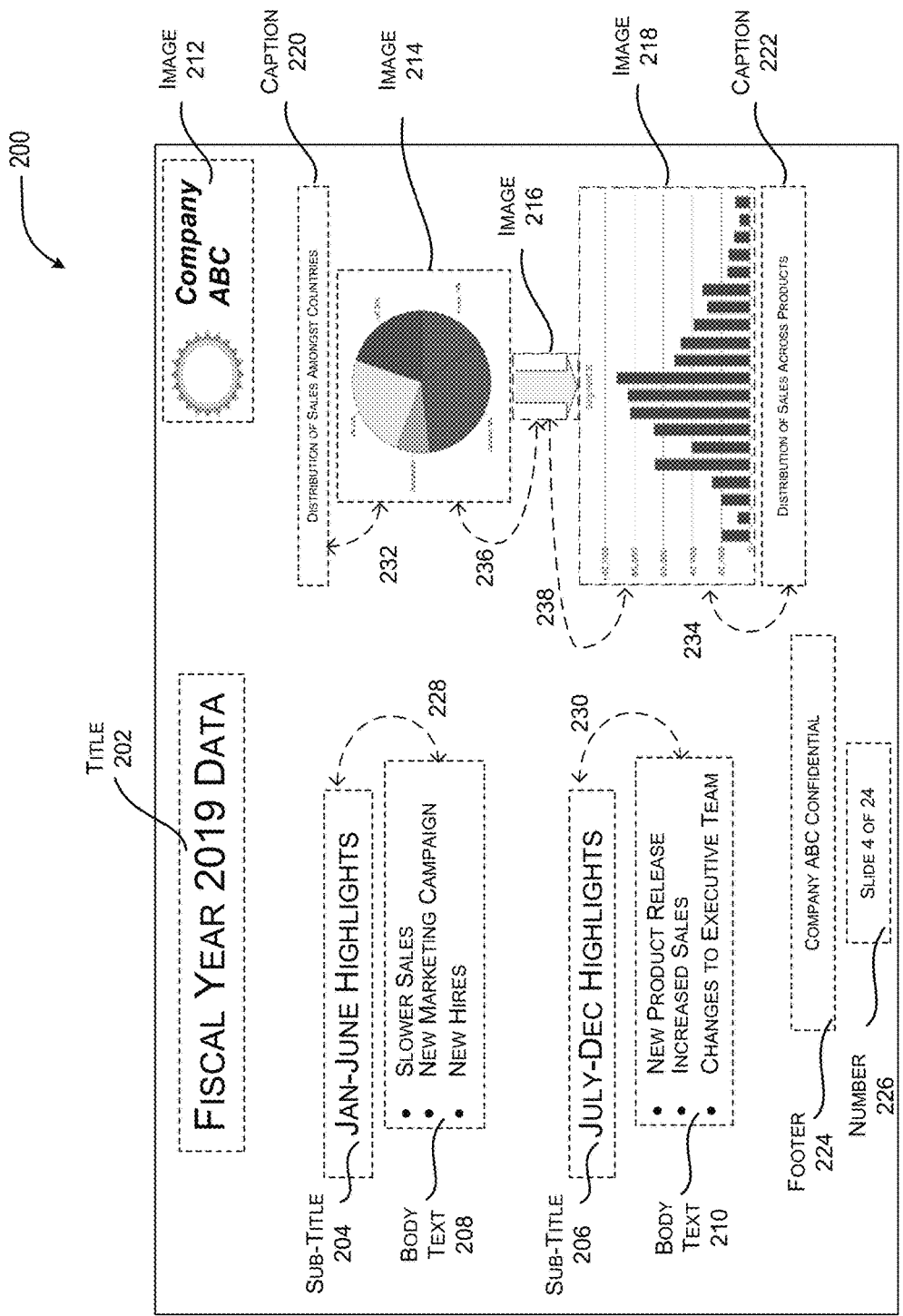
FIG. 2 illustrates an example slide within which roles of the content elements can be determined and semantic relationships can be detected.

FIG. 2 illustrates an example slide 200 within which roles of the content elements can be determined and semantic relationships can be detected. The slide 200 includes original content elements created by a user. The user may have defined the original layout, or structure, of the content elements by selecting the positions on the slide on which to place a content element. Alternatively, the user may have employed the use of a fixed layout template, with placeholders, to place the content elements.

Regardless, due to a lack of experience using the content editing application and/or a lack of time, the original content is not arranged in an optimal manner for a particular purpose (e.g., a professional presentation, etc.). For instance, the slide 200 includes a large amount of blank space which is the area of a canvas that is not covered by a content element. Additionally, the spacing between content elements is not ideal. Accordingly, a user that created this slide 200 may benefit from using the techniques described herein.

As described above, the AGL module 104 is configured to use a machine learning classifier to analyze the slide 200 and determine roles for each of the content elements. In this example, the AGL module 104 determines that the content element that includes "Fiscal Year 2019 Data" is likely a title content element 202. The AGL module 104 determines that the content elements that include "January-June Highlights" and "July-December Highlights" are likely sub-title content elements 204, 206. The AGL module 104 determines that the bullet pointed text below the sub-titles 204, 206 are likely body text content elements 208, 210. The AGL module 104 determines that the company name and logo in the upper right corner is likely an image content element 212. The AGL module 104 determines that the two charts and the arrow that connects the two charts are likely image content elements 214, 216, 218 that comprise a diagram. Further, the AGL module 104 determines that the text above the pie chart is likely a caption content element 220 associated with the image content element 214, and that the text below the bar chart is likely a caption content element 222 associated with the image content element 218. Finally, the AGL module 104 determines that the slide 200 includes a footer content element 224 that states "Company ABC Confidential" and a number content element 226 that indicates that this example slide is number four of a deck that includes twenty-four slides.

As described above, a machine learning classifier can be trained to consider the following parameters when determining a role for a content element: a number of words, a position of a content element on a canvas, a size of the text used in the content element, an understanding of words typically used in particular types of content element (e.g., determined via the use of natural language processing), whether the content element includes graphical content (e.g., a photograph, a drawing, a video, etc.). Additionally, the machine learning classifier can also consider the formatting of a content element. For instance, bullet pointed text is much more likely to be body text rather than a sub-title or a title. In contrast, underlined or italicized text is much more likely to be a title or a sub-title rather than body text.

The AGL module 104 is further configured to detect semantic relationships between content elements that should be preserved in the alternative layouts 108. As shown on the example slide 200, the AGL module 104 detects the semantic relationship 228 between sub-title 204 and body text 208. The AGL module 104 detects the semantic relationship 230 between sub-title 206 and body text 210. The AGL module 104 detects the semantic relationship 232 between image 214 and caption 220. The AGL module 104 detects the semantic relationship 234 between image 218 and caption 222. Finally, the AGL module 104 detects the semantic relationships 236, 238 between images 214, 216, 218 as image 216 includes an object (e.g., an arrow) that connects the two charts in images 214, 218.

Using the determined roles and the detected semantic relationships, the AGL module 104 can generate alternative layouts 108 for the slide 200, examples of which are provided below with respect to FIGS. 3A-3C. When generating the alternative layouts 108, the AGL module 104 may consider predefined rearrangement limitations associated with different roles. For example, a predefined rearrangement limitation may indicate that the title 202 and sub-titles 204, 206 must be presented in a dominant nature compared to the body text 208, 210. Accordingly, the alternative layouts 108 may be generated based on the understanding that the size of text for the title 202 and sub-titles 204, 206 needs to remain larger compared to the size of the text used in the body text 208, 210. In some instances, the size of text of a title or a sub-title may need to be increased so it is larger than the size of text of the body. Conversely, the size of text of the body can be decreased so it is smaller than the size of the text of a title and/or sub-title.

In another example, a predefined rearrangement limitation may indicate that images must maintain the original aspect ratio. Therefore, if a height or a width of images 212, 214, 216, 218 is adjusted to make the image smaller or larger, than the other one of the height of the width must be correspondingly adjusted also. Further, a predefined rearrangement limitation may indicate that images cannot be cropped.

In yet another example, a predefined rearrangement limitation may indicate that text must be a minimum size so that the text is readable. Accordingly, a size of text that fails to meet this minimum size (e.g., the text in the footer 224) may need to be increased so a consumer can better read the text.

Additionally, the AGL module 104 generates the alternative layouts 108 such that they preserve the semantic relationships and reduce the amount of blank space on a slide. Moreover, in some instances, the AGL module 104 generates the alternative layouts 108 so that it honors the original intent of the user. To do this, the AGL module 104 can classify a recognized content element as a moveable element or a non-moveable element. A moveable content element is one that can change positions relative to other content elements on the slide. A non-moveable content element is one that cannot change positions relative to other content elements on the slide.

In one example, the classification of a content element as a moveable element or a non-moveable element can be determined based on whether a role of the content element indicates a position change capability or a position change incapability. In another example, the classification of a content element as a moveable element or a non-moveable element can be determined based on whether the content element is part of a detected semantic relationship (e.g., content elements that are not involved in a semantic relationship may be more likely to change positions). In yet another example, the classification of a content element as a moveable element or a non-moveable element can be determined based on an importance factor associated with the content element.

The importance factor can be determined from an order of entry of the original content on the example slide 200. That is, a user typically may be more likely to enter more important content (e.g., title, sub-titles, images) earlier and less important content later (e.g., header or footer, body text, etc.). Thus, the importance factor can be used to ensure that the user's original structure of more important content elements on the slide is maintained, while less important content elements provide the flexibility for rearrangement in the alternative layouts 108. Therefore, a content element on an original slide that is associated with a capability of changing positions, that is not semantically related to another content element, and/or that is determined to be less important based on an order of entry, may be identified as one that has the flexibility to change positions in the alternative layouts 108.

Figure 3A:
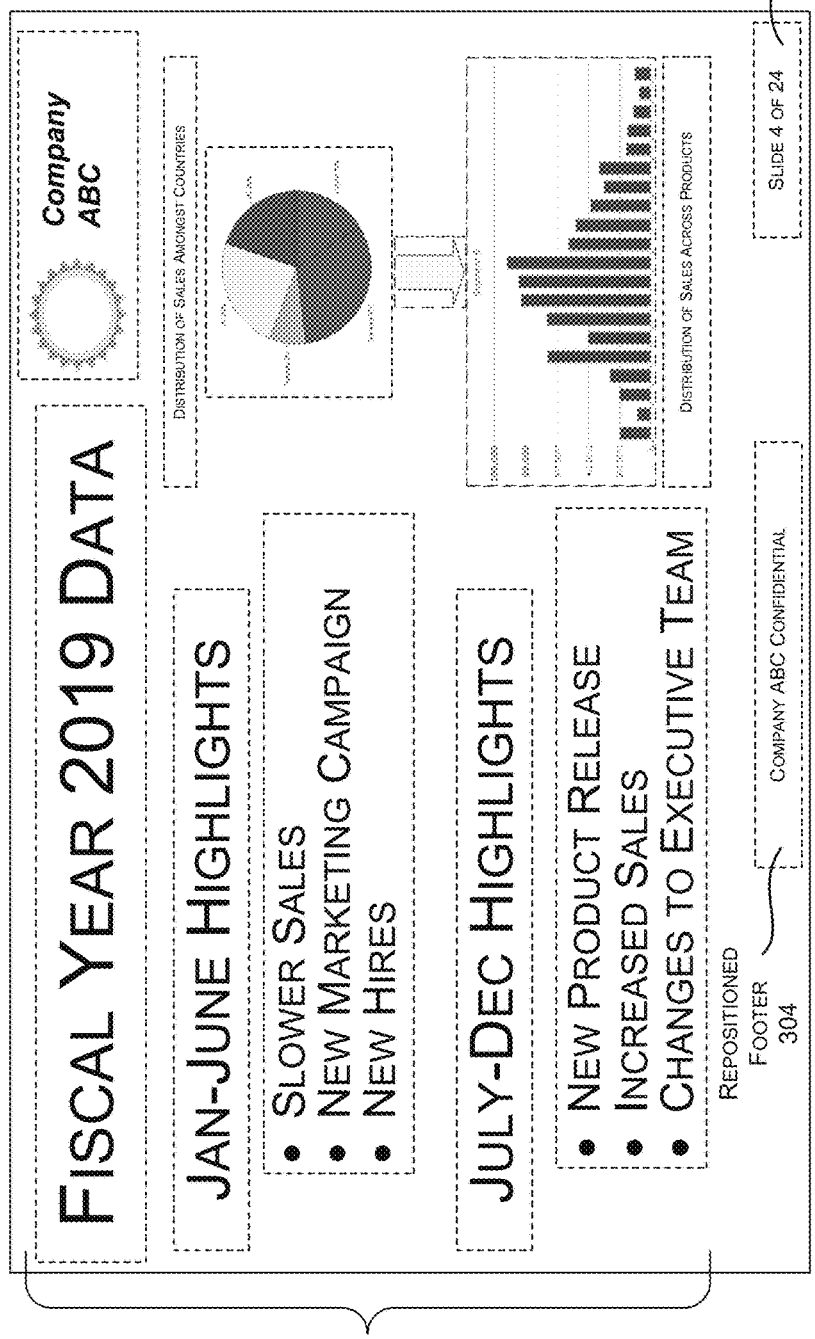
FIG. 3A illustrates a first example of an alternative layout generated based on the roles of the content elements determined for the example slide of FIG. 2 and the semantic relationships detected between content element in the example slide of FIG. 2.

FIG. 3A illustrates a first example of an alternative layout 300 generated based on the roles of the content elements determined for the example slide 200 of FIG. 2 and the semantic relationships detected between content element in the example slide 200 of FIG. 2. As described above, the alternative layouts are generated to provide a user with different arrangements of content.

As shown in the alternative layout 300, each of the semantic relationships from slide 200 is preserved. That is, the body text is graphically associated with the correct sub-title. The captions are graphically associated with the correct images. And objects of the diagram are still structured in the same way. However, in the alternative layout 300, the size of the text in the title, sub-titles, and bodies is increased 302 to improve the presentation and layout of the content elements. Moreover, a size of the company name and logo is increased to improve the presentation and layout of the content elements. To accommodate the increase in text size, the footer is repositioned 304 and the number is repositioned 306, e.g., when compared to the original positions in example slide 200. In various embodiments, a footer and a number may be determined to be moveable content elements.

Figure 3B:
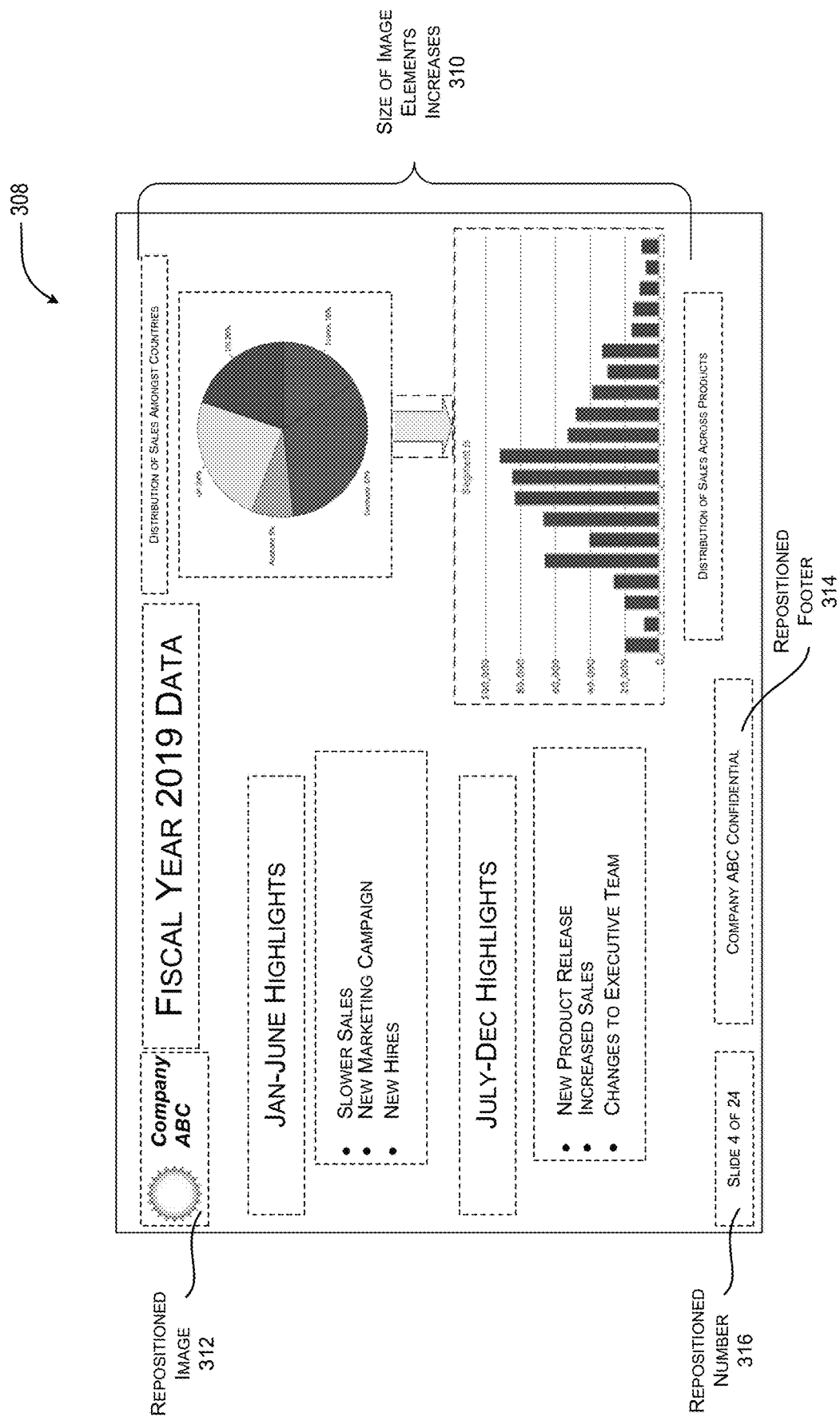
FIG. 3B illustrates a second example of an alternative layout generated based on the roles of the content elements determined for the example slide of FIG. 2 and the semantic relationships detected between content element in the example slide of FIG. 2.

FIG. 3B illustrates a second example of an alternative layout 308 generated based on the roles of the content elements determined for the example slide 200 of FIG. 2 and the semantic relationships detected between content element in the example slide 200 of FIG. 2. Like alternative layout 300, each of the semantic relationships from slide 200 is preserved in alternative layout 308. That is, the body text is graphically associated with the correct sub-title. The captions are graphically associated with the correct images. And objects of the diagram are still structured in the same way. However, in the alternative layout 308, the size of the image content elements is increased 310 to improve the presentation and layout of the content elements. To accommodate the increase in image size, the company name and logo is repositioned 312. Moreover, the footer is repositioned 314 and the number is repositioned 316. In various embodiments, the footer, the number, and the image with the company name and logo may be determined to be moveable content elements.

Figure 3C:
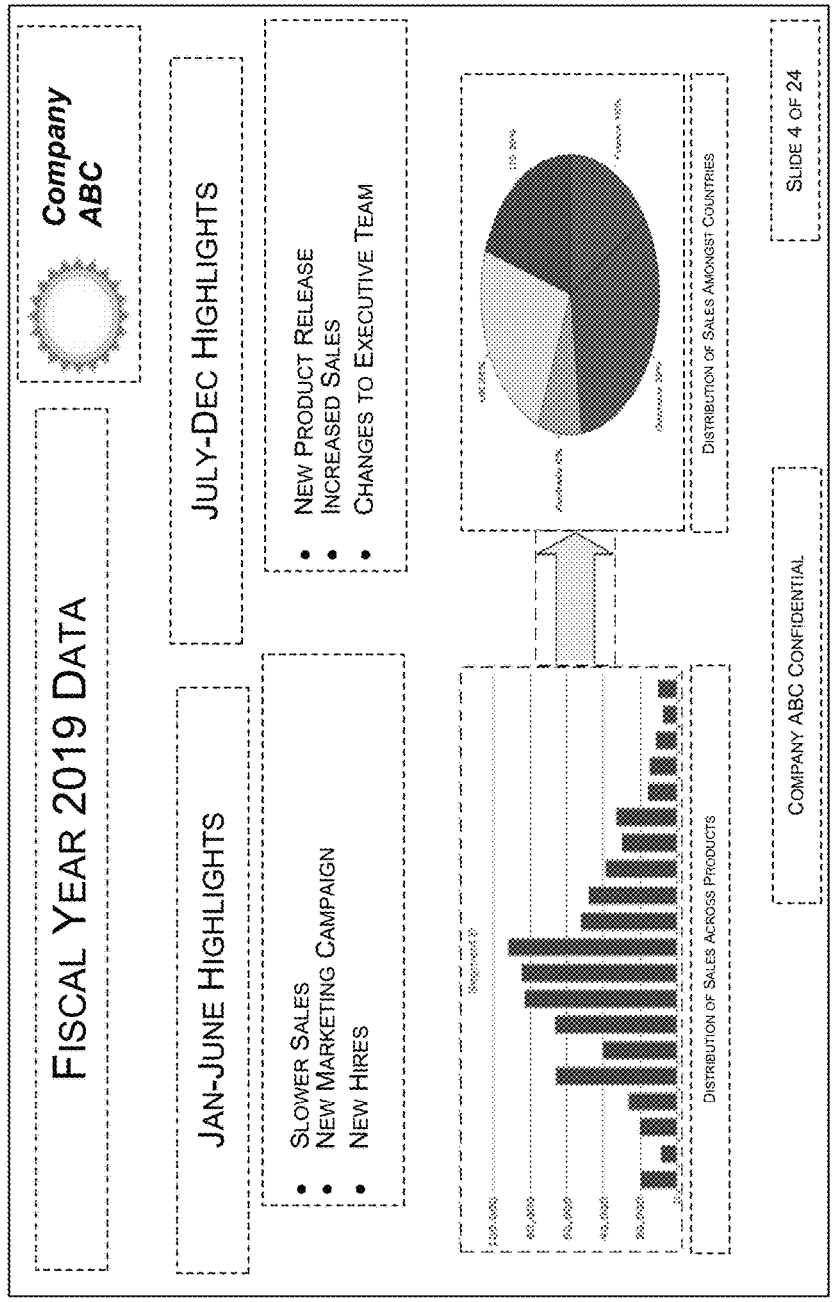
FIG. 3C illustrates a third example of an alternative layout generated based on the roles of the content elements determined for the example slide of FIG. 2 and the semantic relationships detected between content element in the example slide of FIG. 2.

FIG. 3C illustrates a third example of an alternative layout 318 generated based on the roles of the content elements determined for the example slide 200 of FIG. 2 and the semantic relationships detected between content element in the example slide 200 of FIG. 2. Like alternative layouts 300 and 308, each of the semantic relationships from slide 200 is preserved in alternative layout 318. That is, the body text is graphically associated with the correct sub-title. The captions are graphically associated with the correct images. And objects of the diagram are still graphically connected. However, in the alternative layout 318, a larger number of content elements are repositioned to provide the user with a more drastic alternative layout option. For example, as shown, the sub-titles are now positioned side-by-side and are placed above the diagram that includes the charts and the arrow pointing in horizontal direction rather than a vertical direction.

The alternative layouts in FIGS. 3A-3C are provided as an illustrative example to show how the AGL module 104 can implement dynamic alternative layout generation that can be applied to any original configuration of content, whether the configuration is user defined or a fixed layout configuration. While only three alternative layouts are shown, it is understood in the context of this disclosure that the AGL module 104 can generate a larger number of alternative layouts (e.g., five, ten, twenty, one hundred, etc.) depending on a number of content elements, the determined roles, and/or the detected semantic relationships. This enables a user to focus more time on the actual content rather than the way in which the content is structured and presented on a slide. Via the approached described herein, any number of content elements and/or different types of content elements can be accommodated when generating the alternative layouts. Moreover, user intent associated with the editing of the original slide can be preserved as the alternative layouts can be configured to maintain the original structure of non-moveable content elements and/or the semantic relationships between content elements.

Figure 4:
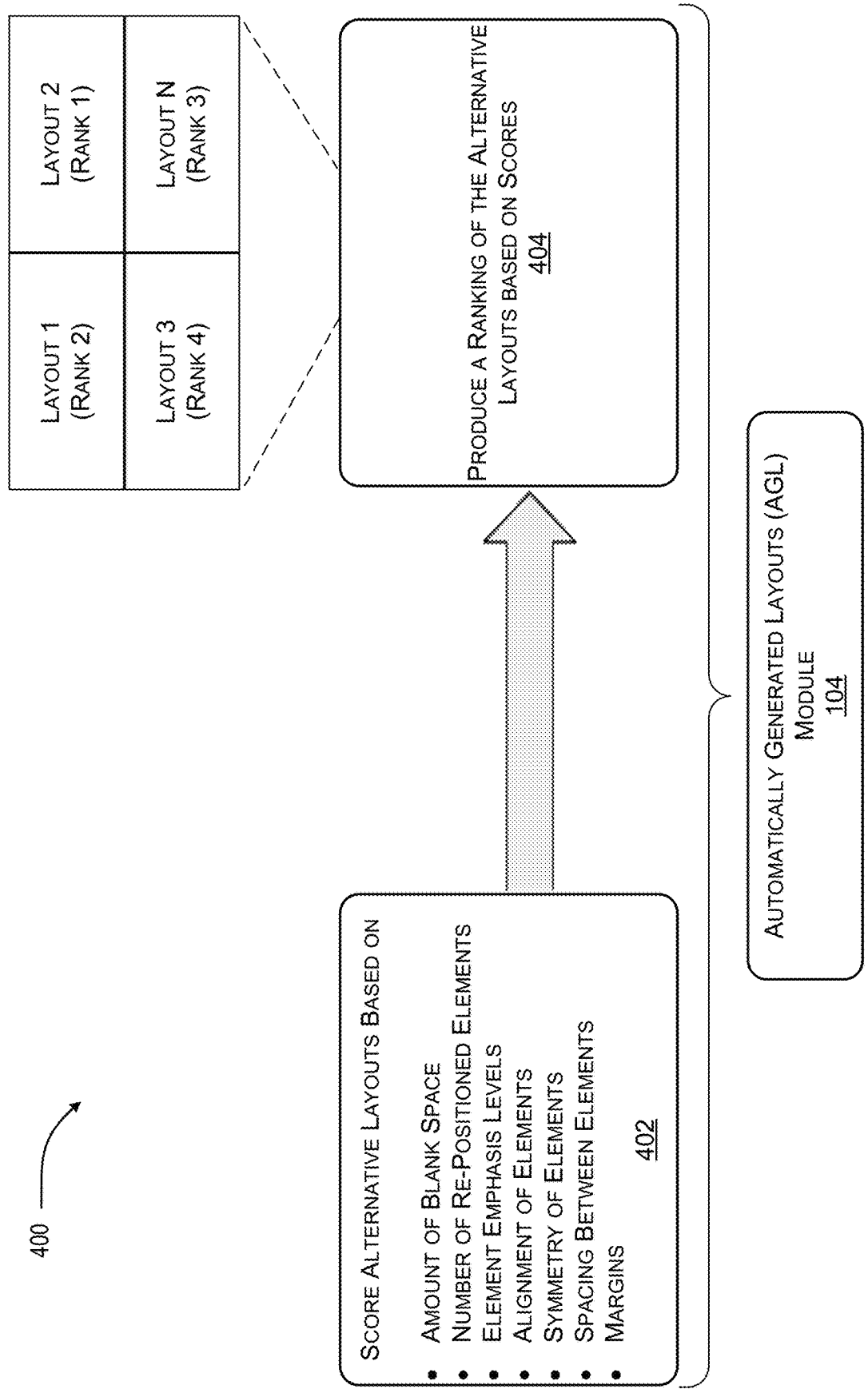
FIG. 4 illustrates an example diagram that assigns a score to each of the alternative layouts generated and produces a ranking based on the scores.

FIG. 4 illustrates an example diagram 400 that shows how the AGL module 104 assigns a score to each of the alternative layouts generated 402 and produces a ranking based on the scores 404. The score can be determined using a machine learning algorithm (e.g., a supervised machine learning algorithm or an unsupervised machine learning algorithm) that considers one or more factors representative of an optimal layout provided the structure of the original content. Moreover, the AGL module 104 can configure different weights for the different factors when determining scores.

For example, a score for an alternative layout can be determined based on an amount of blank space. That is, more blank space on a slide may contribute to a lower score and less blank space on a slide may contribute to a higher score.

In another example, a score for an alternative layout can be determined based on a number of content elements that change positions. In some embodiments, this number may be limited to a number of important content elements that change positions. The importance of a content element can be determined based on one or more of: a role, a semantic relationship, or a user entry order. A higher number of important content elements that change positions may contribute to a lower score and a lower number of important content elements that change positions contribute to a higher score.

In yet another example, a score for an alternative layout can be determined based on element size differences between content elements deemed important and other non-important content elements. That is, the scoring approach can provide value to having certain content elements (e.g., titles, sub-titles, and/or images) be more dominant content elements in the alternative layouts.

In further examples, a score for an alternative layout can be determined based on a degree to which the content elements are aligned (e.g., top alignment, bottom alignment, left side alignment, right side alignment, etc.), where alternative layouts with better alignment are scored higher. A score for an alternative layout can be determined based on a degree to which the content elements are symmetrical (e.g., left and right side symmetry, top and bottom symmetry, etc.), where alternative layouts with better symmetry are scored higher. A score for an alternative layout can be determined based on an amount of spacing between individual ones of the content elements, where alternative layouts with more uniform spacing that allows a viewer to distinguish between content elements may be scored higher than alternative layouts that have uneven spacing of content elements. A score for an alternative layout can be determined based on an amount of spacing between individual ones of the content elements and an edge of the slide (e.g., a slide has properly sized margins). Or, a score for an alternative layout can be determined based on a degree to which emphasis levels between individual ones of the content elements are maintained provided the original emphasis levels of the original slide.

The AGL module 104 can use the produced ranking to select the best, or recommended, alternative layouts. In some instances, the AGL module 104 can provide all the generated alternative layouts to the user so the user can select one to use in an event the user activates a feature requesting system generated alternative layouts. In this case, a display may distinguish between the recommended alternative layouts and other alternative layouts that are ranked lower. In other instances, the AGL module 104 may only provide the recommended alternative layouts for the user to consider. Accordingly, the techniques described herein offer a user a variety of quality layout choices that are visually appealing (e.g., look nice for a professional or academic environment) and/or that are aligned with the user intent in the originally created slide.

In various embodiments, the system can apply different styles in association with a purpose of the document (e.g., a business presentation, a teaching lesson, etc.). A style can include a specific font and/or background colors and images.

Figure 5:
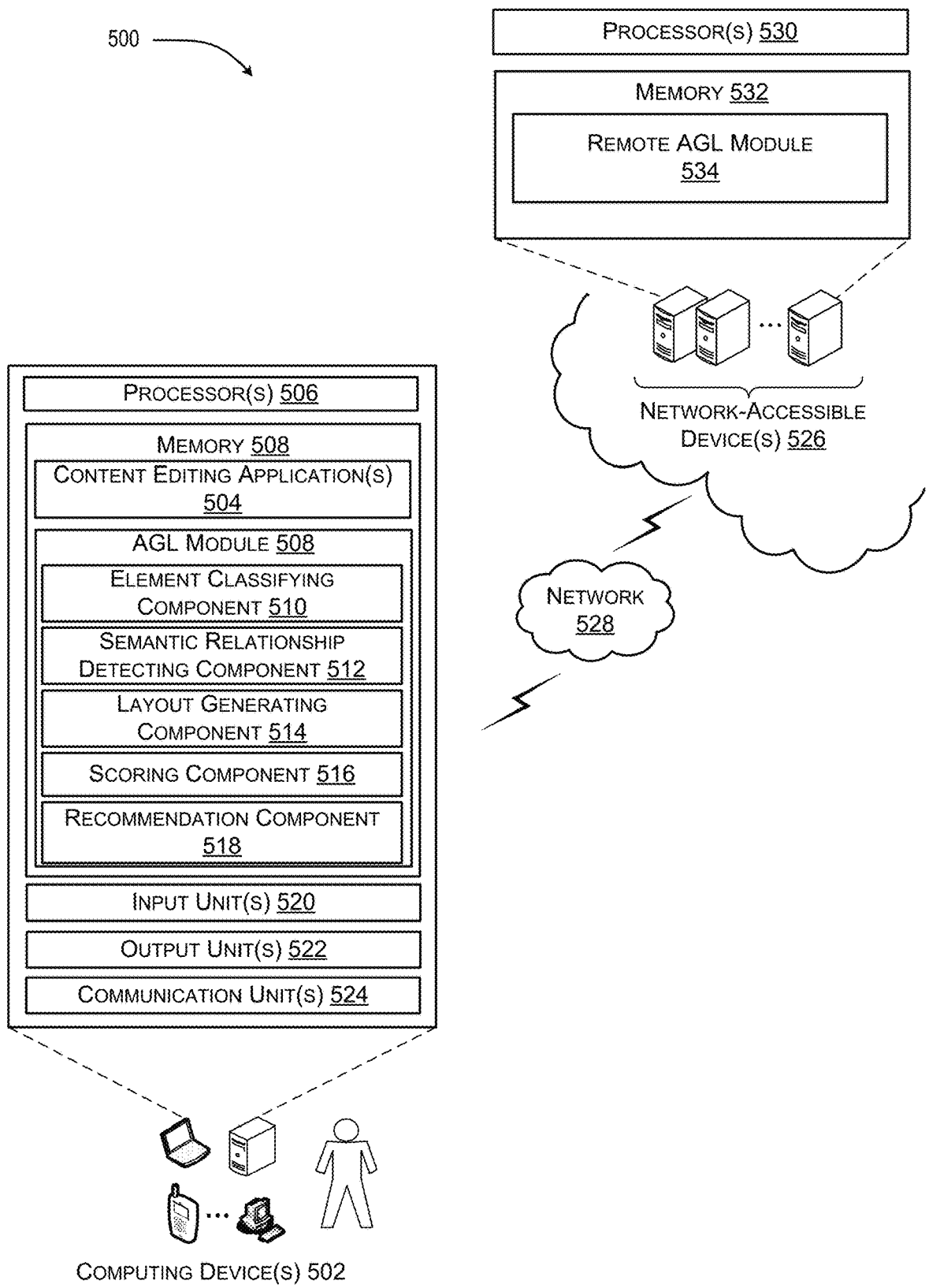
FIG. 5 illustrates an example environment in which an automatically generated layouts (AGL) module can generate alternative layouts and provide the alternative layouts to a user.

FIG. 5 illustrates an example environment 500 in which an automatically generated layouts (AGL) module can generate alternative layouts and provide the alternative layouts to a user. The environment 500 may include one or more computing device(s) 502 where a user is using a content editing application 504 to edit (e.g., create) content on a canvas such as a slide. Computing device(s) 502 may include, but are not limited to, smartphones, mobile phones, cell phones, tablet computers, desktop computers, portable computers, laptop computers, personal digital assistants (PDAs), electronic book devices, gaming consoles, personal media player devices, server computers or any other electronic devices.

A computing device 502 may include one or more processors 506 and memory 508. The processor(s) 506 may be a single processing unit or a number of units, each of which could include multiple computing units. The processor(s) 506 may be implemented as one or more microprocessors, microcomputers, microcontrollers, digital signal processors, central processing units, state machines, logic circuitries, system on chip (SoC), and/or any other devices that manipulate signals based on operational instructions. Among other capabilities, the processors 506 may be configured to fetch and execute computer-readable instructions stored in the memory 508.

The memory 508 may include computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The memory 508 includes the content editing application (s) 504. Moreover, the memory 508 may further include: an element classifying component 510 configured to determine roles for content elements, a semantic relationship detecting component 512 configured to detect semantic relationship between content elements, a layout generating component 514 configured to generate the alternative layouts, a scoring component 516 configured to assign scores and rank the alternative layouts, and/or a recommendation component 518 configured to provide the alternative layouts for display (e.g., to the user).

In various embodiments, the computing device 502 may also include input unit(s) 520 to receive input from the user (e.g., touch screen, buttons, keyboard, mouse, microphones, sensors, etc.), output unit(s) 522 to convey and/or visually present data via the content editing application 504 (e.g., display screens, monitors, speakers, etc.), and communication unit(s) 524 configured to communicate (e.g., receive and/or transmit data) with network-accessible devices 526 via network(s) 528.

In various embodiments, the communication unit(s) 524 are configured to facilitate a wired and/or wireless connection to network 528, content providers, service providers and/or other devices. Therefore, the communication unit(s) 524 and/or network 528 may implement one or more of various wired and/or wireless technologies, such as Internet communications, satellite communications, Wi-Fi communications, mobile telephone network (MTN) communications, or any other acceptable communications or connections protocol.

FIG. 5 also illustrates an implementation where at least some of the functionality implemented by the components of the computing device 502 described above may be performed remotely, or via a network 528, at the network-accessible devices 526. For example, the network-accessible devices 526 may provide cloud services. The network-accessible devices 526 may be servers, and therefore, may also include one or more processors 530 and memory 532. The processor(s) 530 and the memory 532 of the network-accessible devices 526 are physically separate from the processor(s) 506 and memory 508 of the computing device (s) 502, but may function jointly as part of a system that provides processing and memory in part on the computing device(s) 502 and in part on the network-accessible devices 526, for example. These network-accessible devices 526 may be arranged in any number of ways, such as server farms, stacks, and the like that are commonly used in data centers.

The AGL module 508 and/or components illustrated on the computing device 502 are collectively referred to as a remote AGL module 534 on the network-accessible devices 526. Thus, the techniques described herein provide an implementation where the disclosed functionality can be implemented on the computing device 502 or on the network-accessible devices 526, or some of the functionality may optionally be provided at the computing device 502 and at the network-accessible devices 526. Thus, the specific location of the respective modules and/or components used to implement the techniques discussed herein is not limiting and the description below is equally applicable to any implementation that includes local device(s), a cloud-based service, or combinations thereof.

Figure 6:
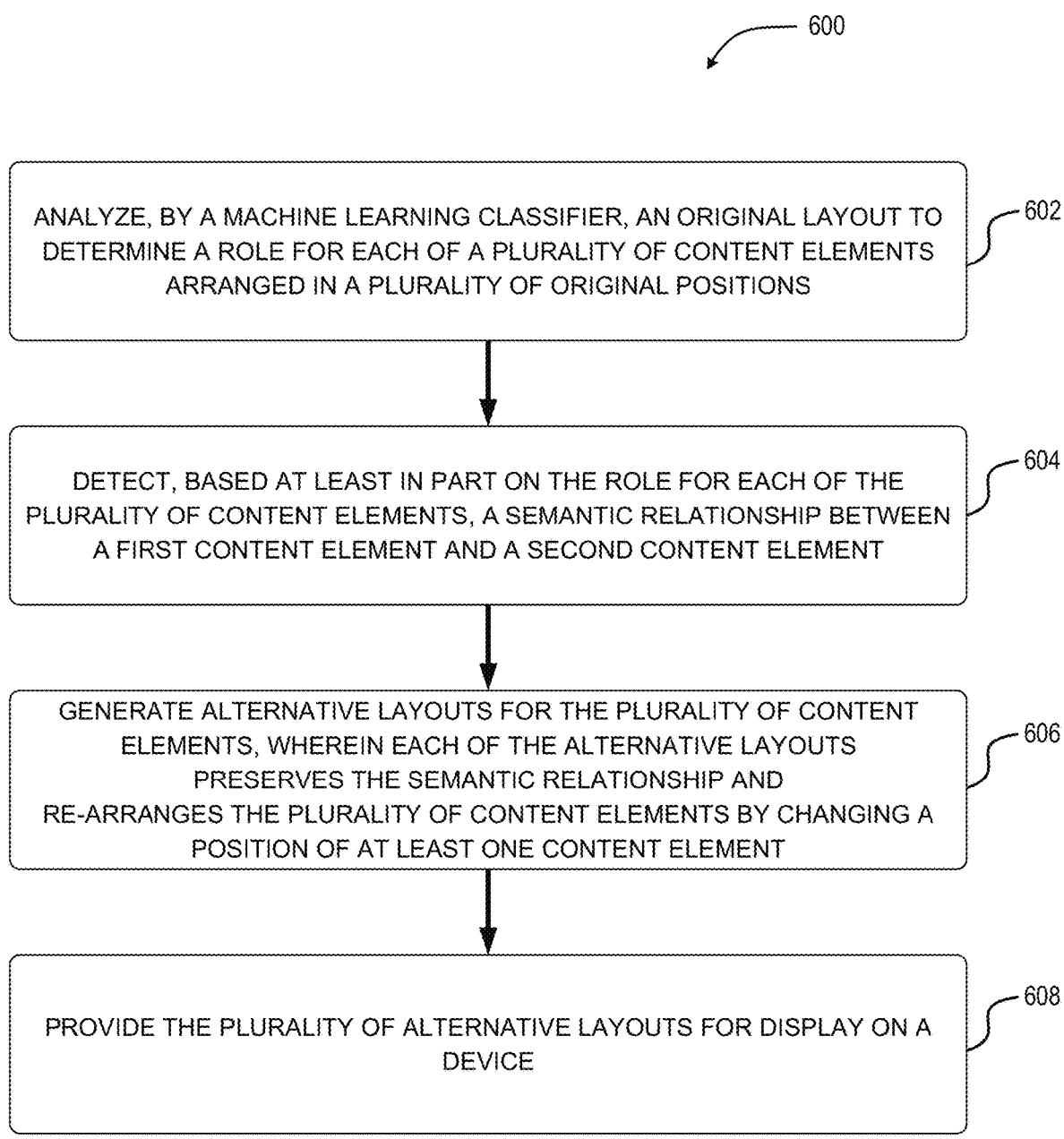
FIG. 6 is a flow diagram showing aspects of a routine for generating alternative layouts provided a canvas with original content arranged in original positions.
Figure 7:
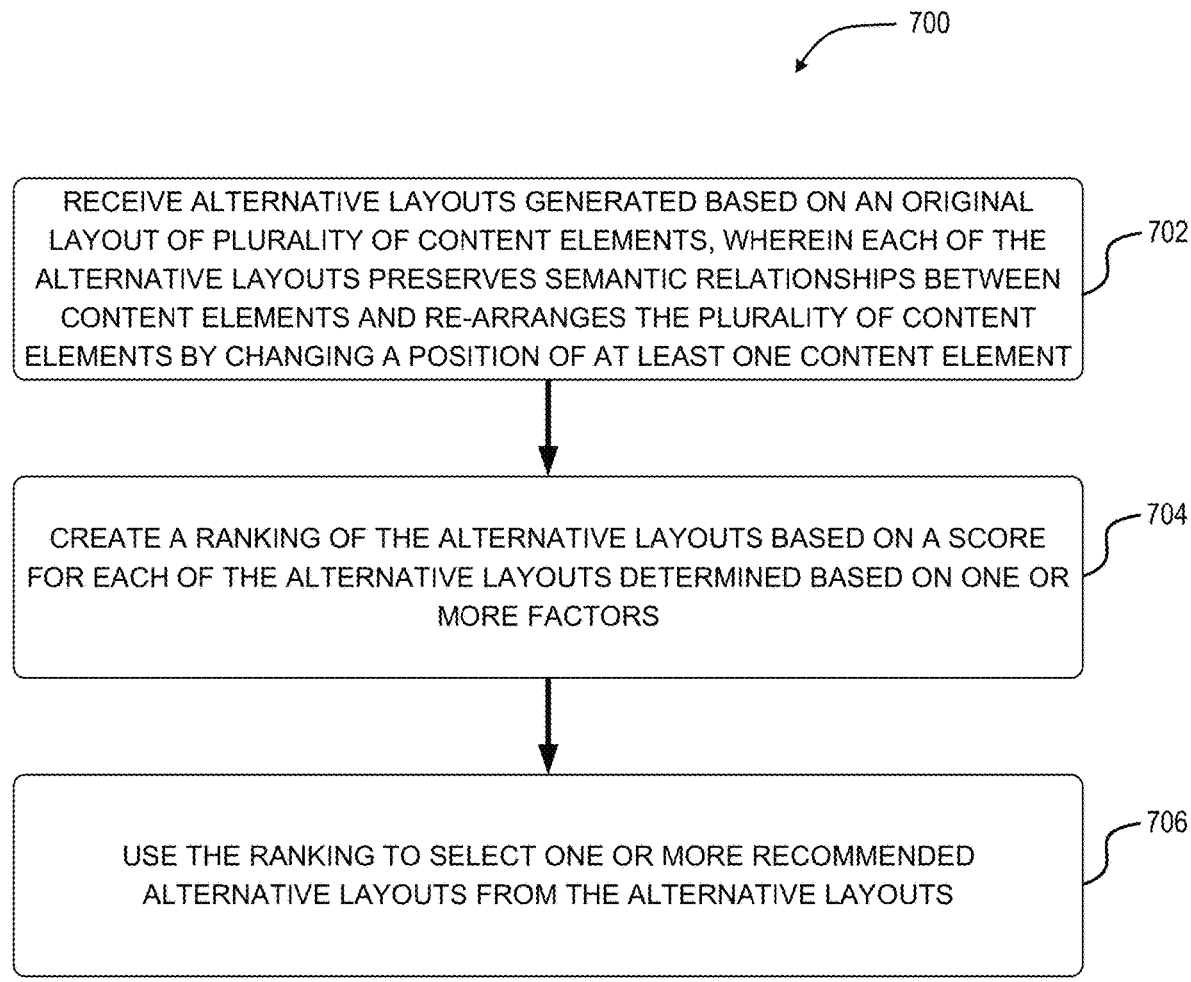
FIG. 7 is a flow diagram showing aspects of a routine for assigning a score to the alternative layouts and producing a ranking of the alternative layouts.

FIGS. 6 and 7 are flow diagrams illustrating routines describing aspects of the present disclosure. The logical operations described herein with regards to any one of FIG. 6 or 7 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

With reference to FIG. 6, the routine 600 begins at operation 602 where an original layout of content is analyzed by a machine learning classifier to determine a role for each of a plurality of content elements arranged in a plurality of original positions.

At operation 604, a semantic relationship between a first content element and a second content element is detected based at least in part on the role for each of the plurality of content elements.

At operation 606, alternative layouts for the plurality of content elements are generated. As described above, each of the alternative layouts preserves the semantic relationship and re-arranges the plurality of content elements by changing a position of at least one content element.

At operation 608, the plurality of alternative layouts are provided to a device for display. This enables a user to view the alternative layouts and select one for use.

With reference to FIG. 7, the routine 700 begins at operation 702 where alternative layouts generated based on an original layout of plurality of content elements are received. As described above, each of the alternative layouts preserves semantic relationships between content elements and re-arranges the plurality of content elements by changing a position of at least one content element.

At operation 704, a ranking of the alternative layouts is created based on a score for each of the alternative layouts. In various embodiments, the score is determined based on various factors that include an amount of blank space on a canvas, a number of re-positioned content elements, a degree to which the content elements are aligned, a degree to which the content elements are symmetrical, an amount of spacing between individual ones of the content elements, an amount of spacing between individual ones of the content elements and an edge of the slide, and/or a degree to which emphasis levels between individual ones of the plurality of content elements are maintained.

At operation 706, the ranking is used to select one or more recommended alternative layouts so the recommended alternative layouts can be provided to the user.

The disclosure presented herein also encompasses the subject matter set forth in the following clauses.

Example Clause A, a computer-implemented method comprising: analyzing, by a machine learning classifier, an original layout of a slide to determine a role for each of a plurality of content elements arranged in a plurality of original positions on the slide; detecting, based at least in part on the role for each of the plurality of content elements, a semantic relationship between a first content element of the plurality of content elements and a second content element of the plurality of elements; generating a plurality of alternative layouts for the plurality of content elements on the slide, wherein each of the plurality of alternative layouts: preserves the semantic relationship between the first content element and the second content element; and re-arranges the plurality of content elements by changing a position of at least one content element; creating a ranking of the plurality of alternative layouts based on a score for each of the plurality of alternative layouts; using the ranking to select one or more recommended alternative layouts from the plurality of alternative layouts; and providing the one or more recommended alternative layouts for display on a device.

Example Clause B, the computer-implemented method of Example Clause A, wherein determining the role for each of the plurality of content elements comprises classifying a respective content element as being one of a title element, a sub-title element, a body element, a header or a footer element, a numbering element, an image element, or a caption element.

Example Clause C, the computer-implemented method of Example Clause A or Example Clause B, wherein the score for each of the plurality of alternative layouts is determined based on at least one of: an amount of blank space; a degree to which the plurality of content elements are aligned; a degree to which the plurality of content elements are symmetrical; an amount of spacing between individual ones of the plurality of content elements; an amount of spacing between individual ones of the plurality of content elements and an edge of the slide; or a degree to which emphasis levels between individual ones of the plurality of content elements are maintained.

Example Clause D, the computer-implemented method of any one of Example Clauses A through C, wherein the score for each of the plurality of alternative layouts is determined based on a number of re-positioned content elements.

Example Clause E, the computer-implemented method of any one of Example Clauses A through C, wherein the score for each of the plurality of alternative layouts is determined based on a number of re-positioned content elements that are labeled as important based on a user order of creation on the slide.

Example Clause F, the computer-implemented method of any one of Example Clauses A through E, wherein the first content element comprises an image and the second content element comprises a caption for the image.

Example Clause G, the computer-implemented method of any one of Example Clauses A through E, wherein the first content element comprises a first object of a diagram and the second content element comprises a second object of the diagram.

Example Clause H, the computer-implemented method of any one of Example Clauses A through E, wherein the first content element comprises a title and the second content element comprises a sub-title.

Example Clause I, the computer-implemented method of any one of Example Clauses A through E, wherein the first content element comprises a sub-title and the second content element comprises body text associated with the sub-title.

Example Clause J, the computer-implemented method of any one of Example Clauses A through I, wherein the at least one content element that changes positions is classified as a moveable content element based on at least one of a corresponding role indicating a position change capability or a lack of a semantic relationship.

Example Clause K, a system comprising: one or more processors; and computer-readable media storing instructions, that when executed by the one or more processors, cause the system to: analyze, by a machine learning classifier, an original layout of content to determine a role for each of a plurality of content elements arranged in a plurality of original positions; detect, based at least in part on the role for each of the plurality of content elements, a semantic relationship between a first content element of the plurality of content elements and a second content element of the plurality of elements; generate a plurality of alternative layouts for the plurality of content elements, wherein each of the plurality of alternative layouts: preserves the semantic relationship between the first content element and the second content element; and re-arranges the plurality of content elements by changing a position of at least one content element; and provide the plurality of alternative layouts for display on a device.

Example Clause L, the system of Example Clause K, wherein the at least one content element that changes positions is classified as a moveable content element based on at least one of a corresponding role indicating a position change capability or a lack of a semantic relationship.

Example Clause M, the system of Example Clause K or Example Clause L, wherein the instructions further cause the system to: create a ranking of the plurality of alternative layouts based on a score for each of the plurality of alternative layouts; and use the ranking to select one or more recommended alternative layouts from the plurality of alternative layouts.

Example Clause N, the system of Example Clause M, wherein the score for each of the plurality of alternative layouts is determined based on at least one of: an amount of blank space; a degree to which the plurality of content elements are aligned; a degree to which the plurality of content elements are symmetrical; an amount of spacing between individual ones of the plurality of content elements; an amount of spacing between individual ones of the plurality of content elements and an edge of the slide; or a degree to which emphasis levels between individual ones of the plurality of content elements are maintained.

Example Clause O, the system of Example Clause M or Example Clause N, wherein the score for each of the plurality of alternative layouts is determined based on a number of re-positioned content elements.

Example Clause P, the system of Example Clause M or Example Clause N, wherein the score for each of the plurality of alternative layouts is determined based on a number of re-positioned content elements that are labeled as important based on a user order of creation on the slide.

Example Clause Q, the system of any one of Example Clauses K through P, wherein the instructions further cause the system to select a style, from a plurality of different styles, for each of the plurality of different layouts.

Example Clause R, a system comprising: one or more processors; and computer-readable media storing instructions, that when executed by the one or more processors, cause the system to: receive a plurality of alternative layouts generated based on an original layout of plurality of content elements, wherein each of the plurality of alternative layouts: preserves semantic relationships between content elements; and re-arranges the plurality of content elements by changing a position of at least one content element; create a ranking of the plurality of alternative layouts based on a score for each of the plurality of alternative layouts, wherein the score is determined based on at least one of: an amount of blank space on a canvas; a degree to which the plurality of content elements are aligned; a degree to which the plurality of content elements are symmetrical; an amount of spacing between individual ones of the plurality of content elements; an amount of spacing between individual ones of the plurality of content elements and an edge of the slide; or a degree to which emphasis levels between individual ones of the plurality of content elements are maintained; use the ranking to select one or more recommended alternative layouts from the plurality of alternative layouts; and provide the one or more recommended alternative layouts for display on a device.

Example Clause S, the system of Example Clause R, wherein the score is further determined based on a number of re-positioned content elements.

Example Clause T, the system of Example Clause S, wherein the number of re-positioned content elements are determined to be important content elements based on a user creation order.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different content elements, two different slides, etc.).

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method comprising:
   creating, based at least in part on input received from a user of a device, a plurality of content elements to be included on a slide, wherein the plurality of content elements are respectively positioned on the slide in a plurality of original positions that compose an original layout;

assigning an importance factor to each of the plurality of content elements based on an order in which the plurality of content elements are created, wherein the importance factor for an earlier created content element is higher compared to the importance factor of a later created content element;

analyzing, by a machine learning classifier, the plurality of original positions for the plurality of content elements on the slide to determine a role that is intended by the user for each of the plurality of content elements;

detecting, based at least in part on the role for each of the plurality of content elements, a semantic relationship between a first content element of the plurality of content elements and a second content element of the plurality of elements;

generating a plurality of alternative layouts for the slide, wherein each of the plurality of alternative layouts:
  preserves the semantic relationship between the first content element and the second content element; and
  re-arranges the plurality of content elements by repositioning at least one content element from an original position to an alternative position;

determining a number of content elements that have been repositioned with respect to the original layout;

determining a score for each of the plurality of alternative layouts based at least in part on the number of content elements that have been repositioned with respect to the original layout and the importance factor for each content element in the number of content elements that have been repositioned;

creating a ranking of the plurality of alternative layouts based on the score for each of the plurality of alternative layouts;

using the ranking to select one or more recommended alternative layouts from the plurality of alternative layouts; and providing the one or more recommended alternative layouts for display on the device.

2. The computer-implemented method of claim 1, wherein determining the role that is intended by the user for each of the plurality of content elements comprises classifying a respective content element as being one of a title element, a sub-title element, a body element, a header or a footer element, a numbering element, an image element, or a caption element.

3. The computer-implemented method of claim 1, wherein the score for each of the plurality of alternative layouts is further determined based on at least one of:
  an amount of blank space;
  a degree to which the plurality of content elements are aligned;
  a degree to which the plurality of content elements are symmetrical;
  an amount of spacing between individual ones of the plurality of content elements;
  an amount of spacing between individual ones of the plurality of content elements and an edge of the slide; or
  a degree to which emphasis levels between individual ones of the plurality of content elements are maintained.

4. The computer-implemented method of claim 1, wherein the first content element comprises an image and the second content element comprises a caption for the image.

5. The computer-implemented method of claim 1, wherein the first content element comprises a first object of a diagram and the second content element comprises a second object of the diagram.

6. The computer-implemented method of claim 1, wherein the first content element comprises a title and the second content element comprises a sub-title.

7. The computer-implemented method of claim 1, wherein the first content element comprises a sub-title and the second content element comprises body text associated with the sub-title.

8. The computer-implemented method of claim 1, wherein the at least one content element that is repositioned is classified as a moveable content element based on at least one of a corresponding role indicating a position change capability or a lack of a semantic relationship.

9. A system comprising:
  one or more processors; and
  computer-readable media storing instructions, that when executed by the one or more processors, cause the system to:
    create, based at least in part on input received from a user of a device, a plurality of content elements to be included on a slide, wherein the plurality of content elements are respectively positioned on the slide in a plurality of original positions that compose an original layout;
    analyze, by a machine learning classifier, the plurality of original positions for the plurality of content elements on the slide to determine a role that is intended by the user for each of the plurality of content elements;
    detect, based at least in part on the role for each of the plurality of content elements, a semantic relationship between a first content element of the plurality of content elements and a second content element of the plurality of elements;
    generate a plurality of alternative layouts for the plurality of content elements, wherein each of the plurality of alternative layouts:
      preserves the semantic relationship between the first content element and the second content element; and
      re-arranges the plurality of content elements by repositioning at least one content element from an original position to an alternative position;
    determine a number of content elements that have been repositioned with respect to the original layout;
    determine a score for each of the plurality of alternative layouts based on the number of content elements that have been repositioned with respect to the original layout;
    create a ranking of the plurality of alternative layouts based on the score for each of the plurality of alternative layouts; and
    provide, based at least in part on the ranking, at least some of the plurality of alternative layouts for display on the device.

10. The system of claim 9, wherein the at least one content element that is repositioned is classified as a moveable content element based on at least one of a corresponding role indicating a position change capability or a lack of a semantic relationship.

11. The system of claim 9, wherein the instructions further cause the system to:
use the ranking to select one or more recommended alternative layouts from the plurality of alternative layouts.

12. The system of claim 9, wherein the score for each of the plurality of alternative layouts is further determined based on at least one of:
an amount of blank space;
a degree to which the plurality of content elements are aligned;
a degree to which the plurality of content elements are symmetrical;
an amount of spacing between individual ones of the plurality of content elements;
an amount of spacing between individual ones of the plurality of content elements and an edge of the slide; or
a degree to which emphasis levels between individual ones of the plurality of content elements are maintained.

13. The system of claim 9, wherein the score for each of the plurality of alternative layouts is further determined based on a number of repositioned content elements that are labeled as important based on an order for which the user adds the plurality of content elements on the slide.

14. The system of claim 9, wherein the instructions further cause the system to select a style, from a plurality of different styles, for each of the plurality of alternative layouts.

15. The system of claim 9, wherein the instructions further cause the system to:
assign an importance factor to each of the plurality of content elements to be included on the slide based on an order in which the plurality of content elements are created, wherein:
the importance factor for an earlier created content element is higher compared to the importance factor of a later created content element; and
determining the score for each of the plurality of alternative layouts is further based on the importance factor for each content element in the number of content elements that have been repositioned.

16. A system comprising:
one or more processors; and
computer-readable media storing instructions, that when executed by the one or more processors, cause the system to:
receive a plurality of alternative layouts generated based on an analysis of original positions of a plurality of content elements in an original layout, wherein each of the plurality of alternative layouts:
preserves semantic relationships between content elements; and
re-arranges the plurality of content elements by repositioning at least one content element from an original position to an alternative position;
determine a number of content elements that have been repositioned with respect to the original layout;
create a ranking of the plurality of alternative layouts based on a score for each of the plurality of alternative layouts, wherein the score is determined based on the number of content elements that have been repositioned with respect to the original layout and at least one of:
an amount of blank space on a canvas;
a degree to which the plurality of content elements are aligned;
a degree to which the plurality of content elements are symmetrical;
an amount of spacing between individual ones of the plurality of content elements;
an amount of spacing between individual ones of the plurality of content elements and an edge of the slide; or
a degree to which emphasis levels between individual ones of the plurality of content elements are maintained;
use the ranking to select one or more recommended alternative layouts from the plurality of alternative layouts; and
provide the one or more recommended alternative layouts for display on a device.

17. The system of claim 16, wherein the number of content elements are determined to be important content elements based on a user creation order.

* * * * *